United States Patent Office
3,481,705
Patented Dec. 2, 1969

3,481,705
PREDIGESTION OF LOW-SILICA BAUXITE
Albert C. Peck, San Francisco, and Robert D. Israel, Oakland, Calif., assignors to Kaiser Aluminum & Chemical Corporation, Oakland, Calif., a corporation of Delaware
No Drawing. Filed Aug. 31, 1964, Ser. No. 393,417
Int. Cl. C01f 7/06, 7/34
U.S. Cl. 23—204  4 Claims

ABSTRACT OF THE DISCLOSURE

A method for improving the separation of silica values from the alumina values in aluminous materials in the digestion step of the Bayer process including reacting at least a portion of the caustic soluble silica of the aluminous material with caustic solution prior to the digestion step. In the pretreatment step, which is applicable preferably to aluminous materials containing relatively low silica values, the aluminous material is treated with caustic solution prior to introduction of the material into a digestion reaction where completion of the alumina extraction and desilication reactions take place.

---

The present invention relates to an improved wet alkali aluminate process for the production of alumina from aluminous materials, such as bauxite. More particularly, the invention is directed to a method of improving the separation of silica values from the alumina values in the digestion step of the well-known Bayer extraction method for aluminous ores containing relatively low silica values. The process is applicable to aluminous materials wherein the alumina values are present in the form of alumina monohydrate (boehmite), alumina trihydrate (gibbsite), or in any mixtures of these forms.

The wet alkali alumina method for production of alumina from aluminous materials, more commonly referred to as the Bayer process, comprises, in general, digestion in a caustic soda solution of aluminous ore, usually under heat and pressure, to solubilize the alumina values contained therein followed by the separation of the residues from the digestion phase and the autoprecipitation of alumina from the pregnant liquor to recover the hydrated alumina in substantially pure form. In the usual practice of the Bayer process, caustic soda is used for bauxite digestion, however, other alkali materials or caustics, such as potassium hydroxide, could be used for bauxite digestion and the instant invention is also applicable to these systems.

In the digestion phase of the Bayer process, the impurities in the ore are suspended in the alumina-rich or pregnant liquor as an insoluble ore residue consisting essentially of iron oxide, titania, and desilication product in the form of complex sodium aluminum silicates formed by reaction of most of the soluble silica with a portion of the sodium aluminate in the liquor.

In the Bayer type processes, the most harmful impurity in the bauxite is silica, especially that which is combined in the form of minerals reactive with hot alkali solution. This combined silica causes substantial losses of both caustic and alumina due to the formation of the desilication product, which probably is $$\text{Na}_2\text{O} \cdot \text{Al}_2\text{O}_3 \cdot 2\text{SiO}_2 \cdot 2\text{H}_2\text{O} \cdot \frac{\text{Na}_2(\text{CO}_3, \text{AlO}_2)}{3}$$

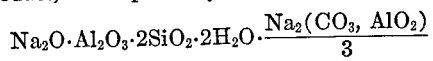

Each pound of combined silica causes a loss of about one pound of alumina which otherwise might be extracted and also causes a loss of caustic soda approximately equivalent to about one pound of sodium carbonate. Consequently, the value of bauxite for Bayer processing is calculated on the basis of both alumina and silica.

Bauxite high in aluminum hydrate and low in silica is regarded as a high grade bauxite while a bauxite higher in silica and lower in alumina is considered a lower grade bauxite. Consequently, bauxites having a silica content higher than 5% by weight are subject to severe price penalties. With bauxites moderately low in silica, e.g., 3% by weight, the loss of soda and alumina values in the desilication product can be tolerated. High silica bauxites require additional processing steps to recover the alumina and caustic values, for example, a lime-soda sintering of the red mud followed by water leaching to obtain a sodium aluminate solution which can be recycled to the digestion phase of the process.

Although low silica bauxites are desirable for processing in the Bayer process, the desilication reactions proceed with increasing difficulty as the amount of silica in the bauxite decreases. For example, with bauxites having less than 2% silica, a satisfactory silica separation may not be attained in the digestion phase, and an undesirable amount of the silica which has dissolved in the caustic liquor flows with the pregnant liquor and will be precipitated in later phases of the Bayer process, thereby resulting in contamination of the product alumina hydrate and excessive scaling of processing equipment.

The Bayer digestion process is based upon two chemical reactions which take place by mixing bauxite with a caustic solution. In the first reaction, the hydrated aluminum oxides dissolve to form sodium aluminate solutions and in the second reaction, silica and silica-bearing minerals that also dissolve in the caustic solution will subsequently react with dissolved sodium and aluminum to precipitate hydrous sodium aluminum silicates (desilication product). The extent to which the second reaction takes place is important, since it affects the purity of the alumina product and also affects the rate of fouling of heat transfer surfaces, pipe lines, and other equipment by complex sodium aluminum silicate scale which tenaciously adheres to metal surfaces.

The reaction of dissolved silica in caustic sodium aluminate solution to form the insoluble sodium-aluminum-silicate complex (desilication product) is known to be autocatalytic. This is due to the fact that the desilication product acts as a seed surface to further crystallization of more product. Therefore, once a certain amount of product, or seed surface, is formed, the reaction becomes self-accelerating. The reaction then relatively rapidly uses up the major part of the dissolved silica so that finally the reaction slows down to a very low rate again, due to depletion of this reactant. This final condition is that desired in Bayer processing of bauxites in order to avoid excessive further deposition of this silicate product on process equipment and piping and in the alumina hydrate product. One way to obtain rapid desilication is to have a relatively large amount of easily dissolvable silica in the bauxite, since this rapidly provides the elevated dissolved silica concentration necessary to initiate nucleation of the solid desilication product, and the relatively large amount of desilication product formed thereafter provides sufficient surface area to insure reducing the final dissolved silica concentration satisfactorily closely to its true solubility level. However, with bauxites which contain very low amounts of silica soluble in caustic, the dissolving of the silica in the normal Bayer digestion proceeds very slowly or only to such an extent that an intermediate silica concentration is reached which is not sufficient to start the autocatalytic reaction but is sufficiently high to cause contamination of the product alumina hydrate and excessive fouling of equipment.

According to the instant invention, poorly desilicating bauxites are treated with a small quantity of caustic prior to introduction into the digestion reactor where completion of the alumina extraction and desilication reactions normally take place. Preferably, an amount of caustic solution is added which contains caustic at least substantially equal to the amount necessary for reaction with the reactive silica present in the bauxite, but substantially insufficient to dissolve all of the alumina present. An excess of caustic above that required for reaction with the silica may be used if it is desired to handle the mixture as a slurry.

Other features and advantages of the invention will become apparent from the ensuing disclosure.

By practice of the instant invention, bauxite, prior to digestion in the Bayer process, is first pretreated by mixing with a relatively small amount of caustic solution. The caustic solution may be either caustic soda liquor used in the Bayer process or NaOH solution. The mixed bauxite and caustic may range in consistency from a dry appearing granular consistency to a thick slurry, depending upon the amount of solution added. A slurry of 30%–40% solids is preferred for most operations. The mixture is then held until a substantial fraction of the silica in the bauxite has been dissolved and the distillation reaction has started. The holding time required will depend upon the temperature and, to a lesser extent, upon the nature of the silicate minerals in the bauxite. Consequently, an elevated temperature above about 100° F. of holding is preferred in order to shorten the time required for the desilication reactions.

Satisfactory results have been obtained by holding the mixture for seven days at 140° F., or for 4 hours at 212° F., or 45 minutes at 230° F., or 20 minutes at 400° F.

It has been found, in the practice of the instant invention, that a substantial part of the silica which normally dissolves in the Bayer digestion will dissolve in the relatively small amount of caustic liquor used in the mixture. Thus, a much higher concentration of silica is achieved in the solution than is possible in the total quantity of caustic soda liquor employed in the Bayer digestion. This high concentration of silica provides the driving force necessary to nucleate desilication product and start the autocatalytic reaction with bauxites containing such small amounts, or slowly dissolving kinds, of silica which, if treated in the normal Bayer digestion, would result in only an intermediate silica concentration which would be inadequate for effectively promoting the autocatalytic desilication reaction.

The desilication reaction product formed in the pretreatment of the bauxite promotes more thorough silica removal in the subsequent Bayer digestion, since only a small amount of silica remains that can yet be dissolved and reacted, yet a relatively large amount of precipitated sodium aluminum silicate is present all during the digestion process to serve as "seed" surface for further precipitation.

The favorable results of the instant invention may be due to the fact that in the pretreatment of the bauxite with a relatively small amount of caustic, there is sufficient caustic available to dissolve most, if not all, of the soluble silica in the bauxite, with the result that a relatively concentrated solution of silica is obtained, which solution is also saturated with aluminate ions. These conditions greatly favor the formation of sodium aluminous silicate, which then remains solid and essentially undisturbed throughout the subsequent Bayer digest.

Although the pretreatment of the bauxite slurry can be done more rapidly at elevated temperatures, it may be accomplished at a lower cost for equipment if carried out at atmospheric pressure. Also, in the case of processing alumina trihydrate bauxites (gibbsite), treatment at a temperature below 240° F. substantially prevents the "reversion" of the alumina trihydrate to alumina monohydrate, which would reduce the recovery of the alumina. If the alumina digestion in the Bayer process is to be carried out at temperatures sufficiently elevated to accomplish satisfactory solution of monohydrate alumina (boehmite), the "reversion" or alumina trihydrate will be unimportant and the pretreatment may be carried on in pressure vessels at elevated temperatures, which will dissolve somewhat more silica and increase the reaction rate to sodium aluminum silicate.

The following examples describe the invention in greater detail and show the efficiency of the invention in improving the silica separation in the Bayer process. It is to be understood that the examples are intended solely for illustrating the invention without constituting a limitation on the true scope of the invention.

EXAMPLE A

The following example shows how the instant invention may be applied to a modified Bayer process known as the "sweetening process." The sweetening process is described in U.S. 2,701,752, which was issued on Feb. 8, 1955 in the name of John L. Porter and is designed for bauxites which contain significant amounts of both boehmite and gibbsite. It is a two-stage process in which a monohydrate-containing ore is subjected to an initial digestion in caustic liquor providing an extraction potential for monohydrate alumina, thereafter increasing the dissolved alumina content of the liquor by digesting a predominantly trihydrate alumina-containing material under conditions for extraction of trihydrate alumina (but not monohydrate alumina). The sweetening process is highly flexible in regard to the type of ore used and in some situations it offers advantages over a single monohydrate or trihydrate digest.

Two tests were run simulating a sweetening digestion on a bauxite having a silica content of 1.1% $SiO_2$ and an alumina content of 42.21% (34.91% trihydrate alumina and 7.3% monohydrate alumina). In one test the bauxite was not treated according to the invention (Test No. 1) while in the other test the bauxite which was added to the monohydrate digestion and the trihydrate digestion was processed according to the invention (Test No. 2).

In Test No. 1, 12.695 grams of dry bauxite was mixed with 150.1 ml. of caustic liquor of the composition approximating that of a liquor used in an alumina refining plant. The caustic liquor contained 250 grams per liter (g.p.l.) of caustic (calculated as $Na_2CO_3$), 90 g.p.l. of dissolved $Al_2O_3$, and 0.64 g.p.l. dissolved $SiO_2$ and had a silica to caustic soda ratio $$\left[\frac{SiO_2}{CS}\right]$$

of $2.56 \times 10^{-3}$. The mixture of bauxite and caustic was digested at 200° C. for 30 minutes than flashed down to a lower pressure. (This approximated the monohydrate digestion of the sweetening process.) To this mixture was then added a slurry (38.5% solids) made by mixing 13.248 grams dry bauxite and 23.72 ml. caustic liquor containing 140 g.p.l. caustic as $Na_2CO_3$, 51 g.p.l. dissolved $Al_2O_3$, and 0.36 g.p.l. dissolved $SiO_2$ and had a silica to caustic soda ratio of $2.56 \times 10^{-3}$. The mixture of the two slurries was then held at 150° C. for 30 minutes (trihydrate digestion step) followed by a flashing down to atmosphere pressure.

The final slurry was composed of insoluble solids suspended in liquor of the following composition: 190 g.p.l. caustic (calculated as $Na_2CO_3$), 125 g.p.l. dissolved $Al_2O_3$ and 0.67 g.p.l. dissolved $SiO_2$. The silica to caustic soda ratio $$\left[\frac{SiO_2}{CS}\right]$$

was $3.54 \times 10^{-3}$.

In Test No. 2, that is, processing the bauxite according to the invention, 12.695 grams of dry bauxite and 19.44 ml. of a caustic liquor containing 170 g.p.l. of caustic (calculated as $Na_2CO_3$), 62 g.p.l. of dissolved $Al_2O_3$, 0.435 g.p.l. dissolved $SiO_2$ and having a silica to caustic soda ratio of $2.56 \times 10^{-3}$ were mixed into a slurry 39.5% solids) and then held for 20 minutes at 195° C. This slurry was then diluted with 130.7 ml. of caustic liquor containing 220 g.p.l. caustic, as $Na_2CO_3$, 80.5 g.p.l. dissolved $Al_2O_3$, 0.57 g.p.l dissolved $SiO_2$ and having a silica to caustic soda ratio of $259 \times 10^{-3}$. This mixture of slurry and caustic liquor was digested for 26 minutes at 200° C. followed by flashing down to a lower pressure. To this slurry was then added a slurry (38.5% solids) which was made by mixing 13.248 grams of dry bauxite and 23.72 ml. of caustic liquor containing 140 g.p.l. caustic (calculated at $Na_2CO_3$), 51 g.p.l. dissolved $Al_2O_3$, 0.36 g.p.l. $SiO_2$ and having a silica to caustic soda ratio of $2.56 \times 10^{-3}$. This second slurry, prior to mixing with the first slurry for digestion in the trihydrate digestion step, was treated according to the invention by heating at 110° C. for 55 minutes.

The mixed slurries were heated in the trihydrate digestion step for 22.5 minutes at 160° C. The resulting slurry from the trihydrate digestion was composed of insoluble solids suspended in a caustic liquor of the following composition: 190 g.p.l. caustic, as $Na_2CO_3$, 125 g.p.l. dissolved $Al_2O_3$ and 0.40 g.p.l. dissolved $SiO_2$. The $$\mathrm{SiO_2/CS}$$

ratio was $2.1 \times 10^{-3}$.

The dissolved silica in the liquor from Test No. 2 is significantly lower than that in Test No. 1. The dissolved silica in the liquor from Test No. 2 has been reduced to 60%

$$\left[\frac{0.40}{0.67} \times 100\right]$$

of the level of the liquor treated in Test No. 1. The low silica in the liquor of Test No. 2 as evidenced by the low value for the silica to caustic ratio $$\left[\frac{SiO_2}{CS}\right]$$

of $2.1 \times 10^{-3}$ indicates that the dissolved silica in the liquor will not cause excessive product alumina hydrate contamination or scaling of process equipment in subsequent step in the Bayer process.

EXAMPLE B

In operating a large-scale alumina plant by a high temperature digestion process designed particularly for the total extraction of caustic soluble alumina from bauxite as described in U.S. 2,964,658 issued on July 26, 1960 in the name of Donald J. Donaldson, bauxites containing from 1% to 2% silica can be processed wherein the pregnant liquor from the digestion step has a low soluble silica concentration of about 0.32 g.p.l. and a $$\mathrm{SiO_2/CS}$$

ratio of $1.5 \times 10^{-3}$.

A test run employing bauxite having 0.44% $SiO_2$ was made. This bauxite was digested for a period of 30 minutes at 240° C. (typical values for this high temperature process). The dissolved silica in the digester effluent rose to 0.438 g.p.l. $SiO_2$ with a $$\mathrm{SiO_2/CS}$$

ratio $2.36 \times 10^{-3}$.

A second run was made with this low silica bauxite but subjecting the bauxite, prior to digestion, to the treatment according to the invention. In the plant digestion operation three digesting vessels are used in series. In this second run, the first vessel was charged with a thick slurry of bauxite and caustic liquor (30% solids) and held at 233° C. for 45 minutes. The effluent from this vessel was then mixed with the balance of the caustic liquor necessary for solution of the alumina. This mixture was then passed through the remaining two vessels of the series at a temperature of 243° C. The time available for digestion was only 20 minutes, however, the alumina extraction was normal. The dissolved silica in the effluent from digestion was 0.317 g.p.l. and the silica to caustic ratio was $1.54 \times 10^{-3}$, which indicate a significant reduction of dissolved silica over that obtained in the first run.

EXAMPLE C

A further test was made on bauxite having a silica content of 1.3% and an alumina content of 43.57% (trihydrate alumina 37.09% and monohydrate alumina 5.48%).

Thirty-five lbs. of the bauxite were mixed in a mulling type mixer with 10.21 lbs. of a caustic liquor containing 249 g.p.l. caustic as $Na_2CO_3$ and 80 g.p.l. dissolved alumina. The resulting mixture which contained about 78% solids was relatively dry so that it could be handled as a bulk material. The mixture was held in a vapor-tight bag for seven days at a temperature of 140° F. A portion of the bauxite so treated was digested according to the sweetening process as described in Example A with a 30 minute digestion at 204° C. for the monohydrate digestion and a 30 minute digestion at 150° C. for the trihydrate digestion. The effluent from the digestion contained: 191.6 g.p.l. caustic, as $Na_2CO_3$, 127.4 g.p.l. dissolved alumina ($Al_2O_3$) and 0.331 g.p.l. dissolved silica ($SiO_2$). The silica to caustic ratio $$\left[\frac{SiO_2}{CS}\right]$$

was $1.73 \times 10^{-3}$.

A sample of the bauxite, without being treated according to the invention, was digested according to the sweetening process under the same conditions as for the sample which was treated according to the invention. The pregnant liquor or effluent from this digestion had a composition as follows: 190.6 g.p.l. caustic, as $Na_2CO_3$, 128.1 g.p.l. dissolved alumina and 0.654 g.p.l. dissolved silica. The silica to caustic ratio $$\left[\frac{SiO_2}{CS}\right]$$

was $3.43 \times 10^{-3}$. Thus, the digestion of the bauxite treated according to the invention yielded a liquor having only 50.6%

$$\left[\frac{0.331}{0.654} \times 100\right]$$

of the dissolved silica content of the liquor obtained from the bauxite without the treatment according to the invention.

This example further demonstrates the efficiency of the instant invention in reducing the dissolved silica level in the pregnant liquor from the alumina digestion step of the Bayer process.

Although advantageous embodiments of the invention have been herein described, it is to be understood that various changes and modifications may be made in the instant invention without departing from the spirit and scope thereof as set forth in the appended claims.

What is claimed is:

1. In the wet alkali aluminate process for the recovery of alumina from aluminous material containing less than about 2% by weight caustic soluble silica wherein the alumina is extracted by digestion in caustic solution and the said silica reacts during digestion with the caustic solution to precipitate hydrous alkali aluminum silicates, the improvement which comprises mixing the aluminous material prior to the digestion step with an amount of caustic solution sufficient to react with at least a portion of the caustic soluble silica of the said aluminous material, holding said mixture for a time sufficient for the caustic solution to react with said portion of said caustic soluble silica and thereafter subjecting the mixture to said digestion step.

2. A process as described in claim 1 wherein the aluminous material is mixed with a caustic solution containing caustic in an amount at least substantially equal to the amount necessary for reaction with substantially all of the caustic soluble silica present in the aluminous material.

3. In the wet alkali aluminate process for the recovery of alumina from aluminous materials containing less than about 2% by weight caustic soluble silica wherein the alumina is extracted by digestion in caustic solution and the said silica reacts during digestion with said solution to precipitate hydrous alkali aluminum silicate, the improvement which comprises mixing the aluminous material prior to the digestion step with an amount of caustic solution to form a slurry of 30% to 40% solids, said caustic solution containing caustic in an amount at least substantially equal to the amount necessary for reaction with substantially all of the caustic soluble silica present in the aluminous material, holding said mixture for a time sufficient for the caustic solution to react with said caustic soluble silica to nucleate sodium aluminum silicate and thereafter subjecting the mixture to said digestion step.

4. A process according to claim 3 wherein said holding step is at a temperature of above about 100° F.

References Cited

UNITED STATES PATENTS

| | | | |
|---|---|---|---|
| 3,413,087 | 11/1968 | Roberts | 23—143 |
| 938,432 | 10/1909 | Peffer | 23—143 |
| 1,271,192 | 7/1918 | Melick | 23—52 |
| 2,018,607 | 10/1935 | Cushing | 23—52 |
| 2,519,362 | 8/1950 | Flint et al. | 23—143 X |
| 2,559,653 | 7/1951 | Mooney | 23—143 |
| 2,701,752 | 2/1955 | Porter | 23—143 |
| 2,939,764 | 6/1960 | Schoenfelder et al. | 23—143 |
| 2,939,765 | 6/1960 | Schoenfelder et al. | 23—143 |
| 2,946,658 | 7/1960 | Donaldson | 23—143 |
| 2,992,893 | 7/1961 | Soudan et al. | 23—143 |

FOREIGN PATENTS

| | | |
|---|---|---|
| 451,987 | 10/1948 | Canada. |
| 17,303 | 9/1963 | Japan. |

OSCAR R. VERTIZ, Primary Examiner

G. J. OZAKI, Assistant Examiner

U.S. Cl. X.R.

23—52